Patented Oct. 31, 1939

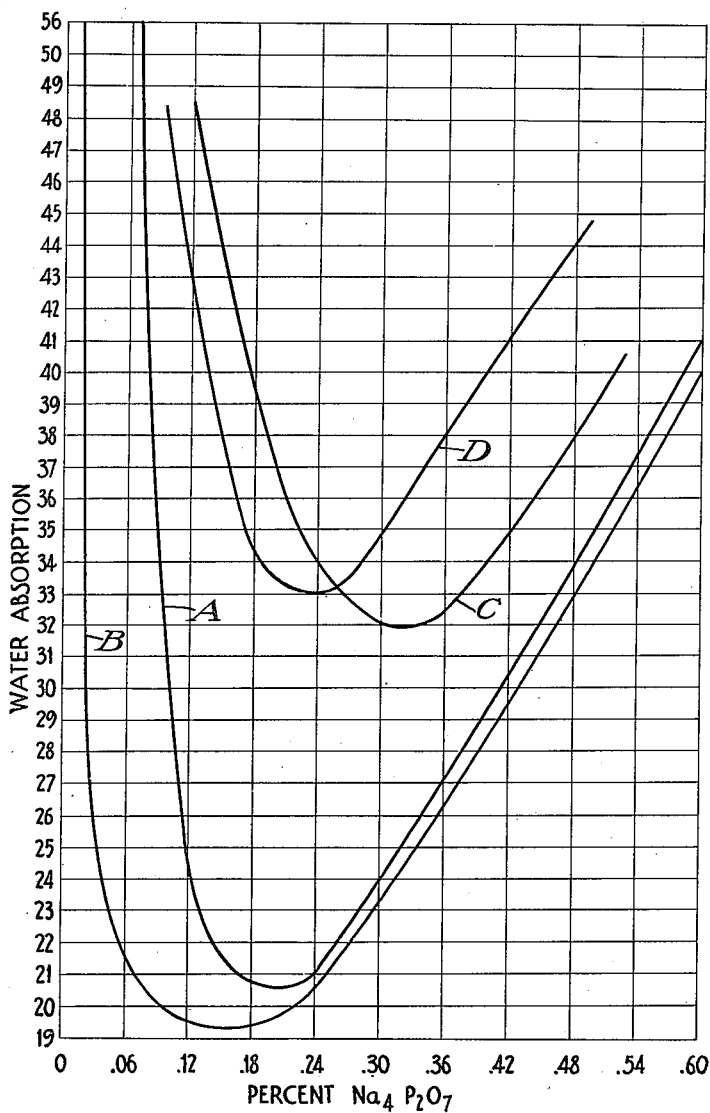

2,178,334

UNITED STATES PATENT OFFICE 2,178,334

WATER DISPERSING ZINC SULPHIDE PIGMENT

James E. Booge, Wilmington, Del., assignor to E. I. du Pont de Nemours & Company, Wilmington, Del., a corporation of Delaware Application June 2, 1937, Serial No. 145,931

8 Claims. (Cl. 134—78)

The present invention relates to the art of inorganic pigments such as are commonly used in the production of coating compositions. More particularly, it relates to the improvement of the properties of prime white pigments thereby increasing the ease with which the pigmented composition can be made. Still more particularly, it relates to the surface treatment of zinc sulphide containing pigments which are intended for use in water suspensions such as coatings for paper, etc.

Treatments of lithopone which consist of coating the surface of the individual particles with a film of an organic acid, soap, or a similar material, have been suggested and pigments thus treated are available. Such pigments are more readily dispersed in linseed oil and other paint vehicles. This organic film renders the pigment unsuited for dispersion in aqueous media.

Due to the increased use of pigments in aqueous suspensions such as in paper pulp suspensions in the fabrication of paper, suspensions for the surface coating of sheet paper, for water paints, etc., research on the ease of dispersibility has been inaugurated. This research has led to valuable discoveries and contributions to the art which are embodied within the present invention.

According to the herein described invention it has been found that the ease of preparing a water suspension of lithopone that approaches perfect dispersion, i. e., free of flocculates and coarse particles, depends to a large extent on the past history of the pigment. Successful use depends on freedom of agglomerates (groups of primary particles held together) and primary particles of an excessive size.

The stability of lithopone suspensions, i. e., the ability of the pigment particles to remain in suspension, depends to a large extent upon the size of the particles in the suspension. This is shown by an examination of Stokes' law which governs such systems and which teaches that the velocity of settling of suspended particles is proportional to the square of the radius of the particle.

Most commercial prime pigment particles are under one micron in radius but the size for maximum hiding power is smaller and in the neighborhood of approximately 0.2 micron. The rate of settling of these small particles in water at ordinary temperatures is readily calculated and it is found that for lithopone, which has density of 4.3, the rate is about 0.1 centimeter per hour. Particles of one micron radius settle twenty-five times as fast or about 2.5 centimeters per hour.

The present invention includes the preparation of zinc sulphide containing pigments which give water suspensions which settle slowly preferably at a rate of less than 2.5 centimeters per hour.

While substantially all the lithopone particles made by the process described in U. S. Patent 1,826,131 may be under one micron in radius, I find that the settling rate when the dry pigment is suspended in water is much greater than is to be anticipated from a consideration of the primary particle size of the pigment. This is because of the non-dispersing quality of the pigment in water. An examination of such suspensions reveals that these particles have grouped themselves into clusters or flocculates and the settling rate is now governed by the size of the flocculate instead of the size of the primary particles. This tendency of the system to appear as a flocculated suspension needs correction and the present invention involves a treatment which will give the desired flocculate-free dispersion.

Aqueous dispersions of calcined prime white pigment have been produced in the past by the use of small amounts of caustic soda, sodium silicate, and other reagents. These dispersions are an essential part of an elutriation process whereby the fine and coarse pigment particles are separated and the latter ground until they reach a satisfactory fineness. This pigment before drying must also be treated with a flocculating agent such as $CaCl_2$, $MgSO_4$, $H_2SO_4$, $MgCl_2$, as above mentioned. Such pigments have been on the market for a considerable length of time and are known to be poor in water wetting characteristics.

The present invention utilizing pyrophosphates must not be confused with the prior art wherein sodium metaphosphate was added to compositions for altogether different purposes than that purpose for which applicant adds his pyrophosphate. For example, sodium metaphosphate has been added to casein compositions in order to prolong the working life of the paint and also for other similar reasons. However, the purpose for adding pyrophosphates to the prime white pigment according to the present invention is to improve the water wetting properties of such pigment and to make it more readily incorporable in aqueous compositions. Further, the amount of pyrophosphate which is mixed with the pigment is very small. If a large amount is added to the pigment the improved water wetting properties are nullified and poorer results are thereby obtained.

The ideal pigment for use in paper, etc., should meet the following as well as other requirements:

1. Very fine and free from gritty material.
2. High refractive index so as to have high covering power.
3. Very readily dispersible in water.
4. High brightness or reflective power.
5. Very inert.

Prime white pigments for the uses referred to above have been found to be lacking in requirement No. 3, namely, "Very readily dispersible in water."

It is an object of the present invention to prepare prime white pigments which pigments are greatly improved in water wetting properties. A further object is the production of a zinc sulphide pigment characterized by extremely low water absorption. A still further object is to produce prime white pigments which are readily suspendable in aqueous media such as paper pulp suspensions, etc. A still further object is the preparation of zinc sulphide containing pigments which give water suspensions which settle slowly preferably at a rate less than 2.5 centimeters per hour. Still further objects will become apparent from an examination of the herein described invention. These objects are attained according to the following description of the present invention.

Broadly, the invention relates to a process for producing a prime white pigment which is capable of readily wetting out, etc., as described above which comprises mixing less than one per cent of a water soluble pyrophosphate with a prime white pigment. The amount of pyrophosphate which is added will vary in an amount less than one per cent, depending upon the prime white pigment which is used as well as previous processing conditions. While the pyrophosphate which is used may vary in an amount less than one per cent, care should be taken that an amount substantially greater than one per cent is not used since it would nullify the improved water wetting properties, low water absorption properties, etc. and produce an unsatisfactory pigment. The product obtained according to this process will be found to be very useful in paper, shoe cleaners, and other compositions employing aqueous media.

In a more restricted sense the present invention consists in a dry treatment of the zinc sulphide containing pigment with about 0.5% or a fractional part thereof, of an alkali metal pyrophosphate. The amount of agent which is added may vary from about .05% to about 0.6% of the pyrophosphate, preferably alkali metal pyrophosphate. It is desirable to add this alkali metal pyrophosphate as a dry powder to the pigment, the pigment being fed to the disintegrating mill where the particles are broken apart and the pyrophosphate is thoroughly mixed with the pigment by the mechanical action of the mill. According to this manner, it has been found that the small quantity of the treating agent can be well distributed throughout the pigment.

The preferred embodiment of the invention consists in mixing between about 0.1% to about 0.3% of an alkali metal pyrophosphate with a zinc sulphide containing pigment. While the present invention extends to the use of all alkali metal pyrophosphates, the sodium pyrophosphates are preferred for obvious economic reasons. While the present treatment has been found to be beneficial to practically all zinc sulphide products, it is preferred to use as a starting point the dried press cake resulting from the process described in U. S. Patent 1,826,131, due to the freedom of this material from a substantial amount of particles having a radius greater than one micron. Because of this, it is possible to obtain suspensions which are quite stable and which have average settling rates well under 2.5 centimeters per hour.

When my preferred amounts of pyrophosphates, viz. amounts designed to produce maximum dispersibility and minimum water absorption, are added to wet slurries of zinc sulphide pigments, it produces such well dispersed suspensions of pigments that it is practically impossible to filter or otherwise separate such pigments from the aqueous media by conventional methods. Therefore, in the instances where the pigment is to be subsequently dried and packaged my preferred method of adding the agent is in the dry condition. If, however, the dispersed water slurry is to be used as such, or after partial thickening rather than to be dried, then the agent may conveniently be added to the pigment water slurry. In certain cases the agent may be added to a thick wet pulp or pressed cake. In such cases the agent is worked into such wet pulp or pressed cake and this is followed by drying, thus obviating the necessity of filtration.

While the treating has been found applicable to all zinc sulphide containing pigments, it has been found extraordinarily well suited to the product made by the process disclosed in U. S. Patent 2,016,536 issued to Booge and Radcliffe. This product, calcined in the presence of an alkali sulphate as a fritting agent is especially well suited for this process and is somewhat better suited than pigments calcined under other conditions or with other fritting agents. While either the potassium sulphate or sodium sulphate fritted pigment may be used for this process, the latter is preferred since by its use, the best results have been obtained. The preferred pigment, therefore, is calcined in the presence of sodium sulphate in accordance with U. S. Patent 2,016,536 and wet ground in accordance with U. S. Patent 1,826,131.

By the term "water soluble pyrophosphate" I have reference to the alkali metal pyrophosphates.

The term "prime white pigments" as used in the disclosure and in the claims is intended to cover zinc sulphide pigments such as commercial zinc sulphide and zinc sulphide either co-calcined or blended with barium sulphate, and other extenders both precipitated and natural.

Any commercial zinc sulphide pigment may be used as a base material and the treating reagent is added to the pigment in a mixing operation. If the pigment has been wet ground and dried as in the process of U. S. Patent 1,826,131 the treatment is preferably made in a mixer or mill such as is currently referred to as a disintegrating or pulverizer mill. The materials are fed into a mill in the proper ratio and the pigment is then ready for use. When the treatment is to be made on an unground pigment the operation is preferably carried out in a ring-roller type of mill equipped with an air separation device. The resulting pigment is substantially free of agglomerates and is ideally suited for incorporation into aqueous compositions.

The following examples are given merely for purposes of illustration and are not intended to impose limitations of any kind upon the present invention described herein.

*Example I*

A steady flow of finely powdered sodium pyrophosphate was added to the lithopone being continuously fed to and disintegrated in a mill of the multiple cage type. The pigment feed was 4000 pounds per hour and the pyrophosphate was added uniformly at about 8 pounds per hour. The resulting pigment had a water absorption of 24 compared to 125 for the untreated pigment.

*Example II*

The conditions of Example I were repeated except that the zinc sulphite containing pigment was fed at a 3000 pound rate and the agent added at 12 pounds per hour. The pigment contained 0.24% of $Na_4P_2O_7$ and required only 21 grams of water per 100 grams of pigment to make a flowing paste while the untreated control required 120 grams of water to prepare a like paste.

*Example III*

Sodium pyrophosphate in a finely powdered condition was continuously added to a conveyor which carried dry calcined lithopone to a hammer type mill in an amount sufficient to give 0.18% by weight in the pigment. The untreated pigment had a water absorption of 125 while this property in the treated product was decreased to 20. The treated pigment settled very slowly when suspended in water at a concentration of 50 grams per liter while the untreated material settled to give a clear supernatant liquid at the end of 15 minutes. At the end of 24 hours the major portion of the treated pigment remained in suspension showing the effectiveness of the treatment.

*Example IV*

The treatment of Example II was repeated except that the amount of the pyrophosphate was increased to 1.2%. The product had a water absorption of 69 and the paste when painted upon a smooth glass surface gave a poor appearance due to the brush marks whereas the product of Example II gave a pleasing smooth appearance. Too much pyrophosphate was added causing flocculation of the pigment and high water absorption.

*Example V*

Sodium pyrophosphate was added to the screw conveyor continuously feeding high strength lithopone (50% ZnS) to a ring roller mill at a rate sufficient to give 0.9% in the finished product. The water absorption was found to be 50 as compared to 115 for the original untreated pigment. The rate of feeding of the chemical was then decreased to give 0.5% in the pigment and the water absorption was then found to be 30. The smaller quantity of the reagent thus proved more beneficial than the larger amount.

As a means of rapidly evaluating various treatments, a useful and rapid test to show the relative effectiveness of the various treatments has been developed and will now be explained in detail. The grams of water per 100 grams of pigment used to make a free flowing paste has been termed the water absorption of the pigment. It is determined by placing 100 grams of the pigment in a tin can which is 3¼ inches in diameter and 3½ inches high (a pint paint can with top cut off) and adding water while stirring with a spatula. A spatula having a blade 4½ inches long and ⅞ inch wide with a square cornered end is used for stirring. The water is added from a 50 cc. burette in small portions. 10 cc. are first added and then thoroughly worked in with the spatula. The next additions are made in 5 cc. portions with stirring after each addition. When the end point is approached, the water additions are decreased to 1 cc. portions and the final amount should be added in a one-half cc. portion. Experience in the test will teach the proper amount to use for the next addition and, since variations from 20 cc. or less to over 100 cc. have been encountered for various pigments, the proper number of 5 cc. portions to add cannot be specified without knowing something about the history of the pigment under test. The final addition produces a free flowing suspension which is free of lumps of pigment.

The following tabulation shows the improved water absorption properties of zinc sulphide pigments having pyrophosphate added to it. The first column shows the amount of sodium pyrophosphate added and the other columns show the water absorption of pigments A, B, C, and D with such additions of sodium pyrophosphate. In all instances the agent was calculated as $Na_2P_4O_7$.

| Pyrophosphate added, percent | Water absorption | | | |
|---|---|---|---|---|
| | A | B | C | D |
| 0.0 | 125.0 | 108.0 | 110.0 | 123.0 |
| 0.06 | | 21.5 | | |
| 0.12 | 24.5 | 19.5 | 48.5 | 43.0 |
| 0.18 | | 20.0 | 40.0 | 34.0 |
| 0.24 | 21.0 | 20.5 | 34.0 | 33.0 |
| 0.30 | | 24.0 | 32.0 | 36.0 |
| 0.36 | 28.0 | 26.0 | 32.5 | 38.5 |
| 0.48 | 34.0 | 34.0 | 38.0 | 44.0 |
| 0.60 | 41.0 | 40.0 | | |
| 0.90 | 55.0 | 52.0 | | |
| 1.20 | 67.0 | 60.0 | | |

The data which are tabulated above are plotted in the attached chart. Each pigment shown therein has its own characteristics and responds somewhat differently to the pyrophosphate treatment. All pigments give minima, but, as is readily observed, the amount of pyrophosphate required to give the minimum will not be the same for all pigments. This variation is thought to be due largely to variations in previous processing treatments.

Since one cannot set up a definite amount of pyrophosphate as the proper treatment for zinc sulphide pigments, the proper course to follow is to predetermine the amount that gives the low water absorption values and from the data select the amount which gives the best results. As the curves will show, some pigments may require around 0.3% while others may need only about 0.12% of the reagent and substantial decreases in water absorption will be realized with 0.06% or less in some instances. Before beginning a plant treatment I prefer to remove a portion of the material to be treated and treat 100 gram portions with varying amounts of the pyrophosphate between 0.05% and 0.60% by a thorough dry mix. The water absorption is then determined and the treatment that gives the lowest water absorption is thereby observed. This treatment can then be used in the plant operation. This method of predetermining the amount of the reagent required for the pigment to be treated has proven quite desirable and the most effective results are thereby assured.

In some instances I prefer to use the amount that gives the minimum water absorption. With other pigments this absorption value may be lower than required for certain uses and I may then use more or less than this amount. In very few instances will I use more than 0.1% additional nor more than 0.1% less than the amount that gives the minimum water absorption. The water absorption after such treatment will be far below that of the untreated control even though the amount is only within 0.1% of this optimum.

It is to be understood that this treatment is not limited to lithopone and covers all other zinc sulphide containing pigments. The amount of the pyrophosphate can vary within reasonable limits but an amount between about 0.1% to about 0.3% is preferred. It is usually added as the hydrated salt. The sodium salt $Na_4P_2O_7.10H_2O$ is the most available one and less costly and is therefore the preferred reagent although the invention is not limited thereto. The pyrophosphates are preferably added as hydrated pyrophosphates but the figures given in this specification as well as in the appended claims refer to the pyrophosphates calculated as the anhydrous salts. For example, 1 gram of sodium pyrophosphate regardless of whether added as the hydrated salt or in the anhydrous form, means the equivalent of 1 gram of $Na_4P_2O_7$. These pyrophosphates give results superior to other phosphates such as sodium hexametaphosphate. When zinc sulphide pigments are treated with sodium hexametaphosphate and subsequently packaged it has been found that these pigments are somewhat hydroscopic and tend to form agglomerates particularly in a somewhat humid atmosphere such as occurs in many localities during the spring and summer seasons. This agglomeration or caking is particularly objectionable because such pigments when incorporated into coating compositions show up as a rough film. My treatment avoids this disadvantage.

Having described the present invention, the following is claimed as new and useful:

1. In a process for the production of an improved zinc sulphide pigment having a water absorption less than 40 the steps which comprise adding to a dry zinc sulphide containing pigment which has previously been calcined in the presence of an alkali metal sulphate between about 0.18% and about 0.36%, based upon the weight of the zinc sulphide containing pigment, of dry sodium pyrophosphate, and subsequently mixing to obtain substantial uniform distribution of the phosphate.

2. A dry pigment composition having a water absorption less than 40 which comprises an intimate mixture of a calcined zinc sulphide containing pigment and between about 0.18% and about 0.36%, based upon the weight of the zinc sulphide containing pigment, of sodium pyrophosphate.

3. In a process for the production of an improved zinc sulphide pigment having a water absorption less than 40 the steps which comprise adding to a dry zinc sulphide containing pigment which has previously been calcined in the presence of an alkali metal sulphate between about 0.18% and about 0.36%, based upon the weight of the zinc sulphide containing pigment, of a dry alkali metal pyrophosphate, and subsequently mixing to obtain substantial uniform distribution of the phosphate.

4. In a process for the production of an improved zinc sulphide pigment having a water absorption less than 40 the steps which comprise adding to a dry zinc sulphide containing pigment which has previously been calcined in tre presence of sodium sulphate between about 0.18% and about 0.36%, based upon the weight of the zinc sulphide containing pigment, of dry sodium pyrophosphate, and subsequently mixing to obtain substantial uniform distribution of the phosphate.

5. In a process for the production of an improved zinc sulphide pigment having a water absorption less than 40 the steps which comprise adding to a calcined zinc sulphide containing pigment between about 0.18% and about 0.36%, based upon the weight of the pigment, of an alkali metal pyrophosphate, and subsequently mixing to obtain substantial uniform distribution of the phosphate.

6. In a process for the production of an improved zinc sulphide pigment having a water absorption less than 40 the steps which comprise adding to a dry calcined zinc sulphide containing pigment between about 0.18% and about 0.36%, based upon the weight of the pigment, of an alkali metal pyrophosphate, and subsequently mixing to obtain substantial uniform distribution of the phosphate.

7. In a process for the production of an improved zinc sulphide pigment having a water absorption less than 40 the steps which comprise adding to a dry calcined zinc sulphide containing pigment between about 0.18% and about 0.36%, based upon the weight of the pigment, of sodium pyrophosphate, and subsequently mixing to obtain uniform distribution of the phosphate.

8. A dry pigment composition having a water absorption less than 40 which comprises an intimate mixture of a calcined zinc sulphide containing pigment and between about 0.18% and about 0.36%, based upon the weight of the pigment, of an alkali metal pyrophosphate.

JAMES E. BOOGE.